United States Patent

Salgado

[11] Patent Number: 5,562,411
[45] Date of Patent: Oct. 8, 1996

[54] FAN MOUNTING ARRANGEMENT

[75] Inventor: Mauricio M. Salgado, Escondido, Mexico

[73] Assignee: Carrier Corporation, Syracuse, N.Y.

[21] Appl. No.: 546,485

[22] Filed: Oct. 20, 1995

[51] Int. Cl.⁶ .................................................. F04D 29/60
[52] U.S. Cl. .......................................... 415/213.1; 62/263
[58] Field of Search ................................ 415/213.1, 223; 454/350, 354; 62/263

[56] References Cited

U.S. PATENT DOCUMENTS

| | | |
|---|---|---|
| 2,710,573 | 6/1955 | Marker ................................... 454/354 |
| 2,810,514 | 10/1957 | Patrick ................................. 415/213.1 |
| 3,848,428 | 11/1974 | Reiter, Jr. . |
| 3,874,191 | 4/1975 | Hudson ................................. 415/213.1 |
| 3,984,224 | 10/1976 | Dawkins . |
| 4,043,143 | 8/1977 | Finder et al. . |
| 4,051,691 | 10/1977 | Dawkins . |
| 4,134,275 | 1/1979 | Erickson et al. . |
| 4,201,064 | 5/1980 | Krug et al. . |
| 4,592,207 | 6/1986 | Rummel . |
| 4,607,497 | 8/1986 | Ferdows et al. . |
| 4,622,831 | 11/1986 | Grupa . |
| 4,641,502 | 2/1987 | Aldrich et al. . |
| 4,727,728 | 3/1988 | Brown . |
| 4,732,011 | 3/1988 | Haiya . |
| 4,748,825 | 6/1988 | King . |
| 4,787,210 | 11/1988 | Brown . |
| 4,834,615 | 5/1989 | Mauch et al. ........................ 415/213.1 |
| 4,898,003 | 2/1990 | Ichikawa et al. . |
| 4,905,478 | 3/1990 | Matsuda et al. . |
| 4,926,655 | 5/1990 | King . |
| 5,005,372 | 4/1991 | King . |
| 5,184,474 | 2/1993 | Ferdows . |
| 5,267,610 | 12/1993 | Culbert . |
| 5,285,654 | 2/1994 | Ferdows . |

FOREIGN PATENT DOCUMENTS 5-10546  1/1993  Japan ...................................... 62/263

*Primary Examiner*—James Larson

[57] ABSTRACT

A mounting arrangement for a fan assembly having a fan mounting plate. The mounting plate is adapted to be received in a structural retainer at a lower end thereof and is provided with a notch in the upper edge thereof which is adapted to engage a U-shaped bracket in the wall to which the assembly is being attached. Attachment of the mounting plate to the wall is achieved by use of a retaining clip comprising three spaced parallel fingers. The middle finger of the clip is received within the U-shaped bracket and the two other fingers are adapted to engage the plate on opposite sides of the notch. When the clip is inserted into engagement, the thickness of the fingers is such that the clip is frictionally retained in the described position to thereby hold the plate in operable engagement with the wall.

5 Claims, 9 Drawing Sheets

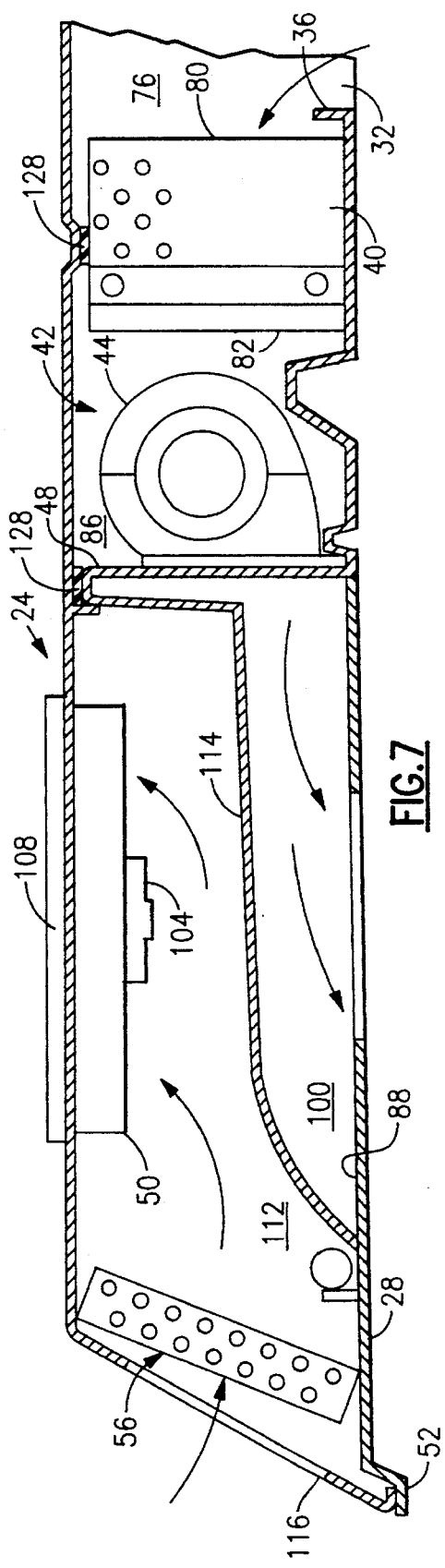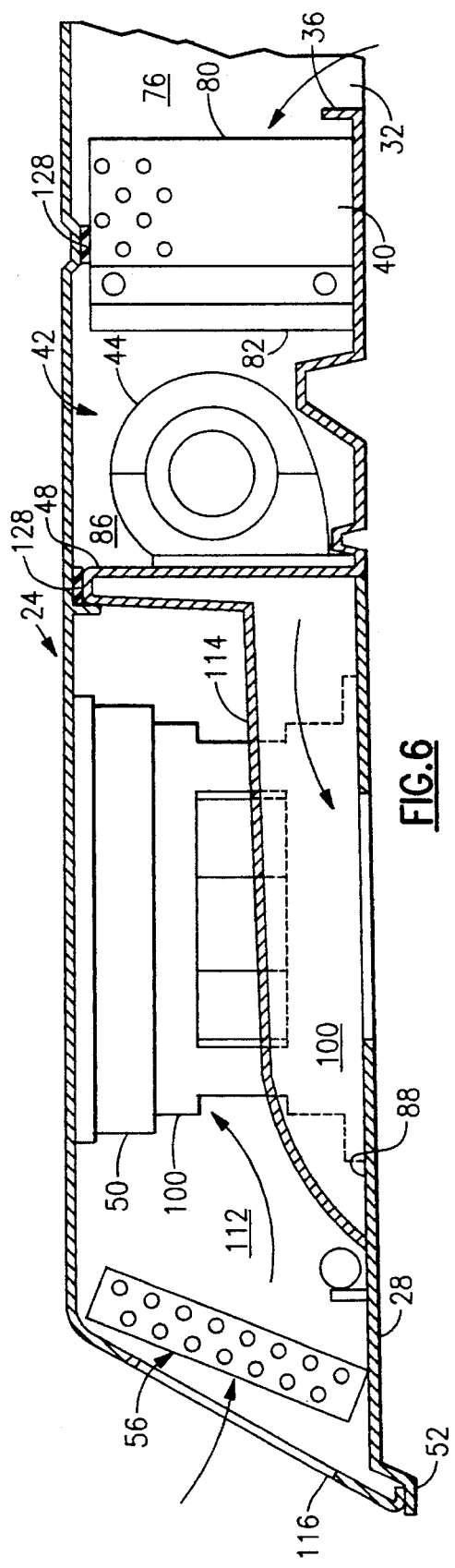

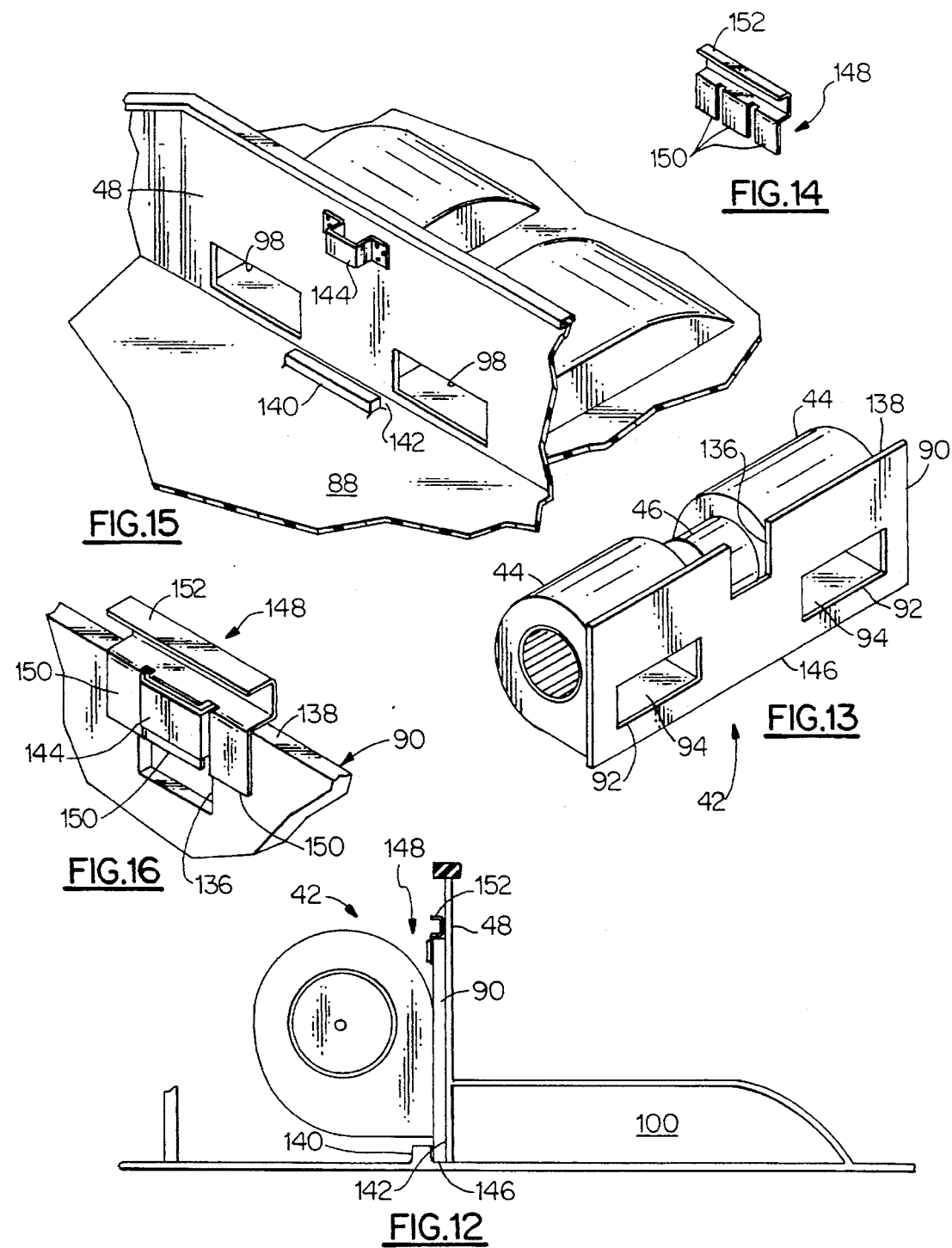

FAN MOUNTING ARRANGEMENT

BACKGROUND OF THE INVENTION

The present invention relates in general to air conditioner units, and more specifically to an arrangement for mounting an evaporator fan assembly in an air conditioner unit of the type suitable for mounting on the roof of a vehicle, such as a bus.

It is well known to mount air conditioner units on the roof of a vehicle such as a bus. Typically, such units contain the heat exchangers and the evaporator and condenser fans and various air supply passageways for allowing return air from the interior of a bus to be passed through the evaporator assemblies and thence returned to the bus in a cooled and dehumidified condition. Likewise, passageways are provided for the condenser air flow for rejection of heat from the unit.

It is always difficult when servicing a unit such as this type which is mounted on the top of a vehicle. Accordingly, it is considered desirable to design such units in a manner which facilitates easy assembly and removal of components as required for replacement and/or routine maintenance.

It is an object of the present invention to provide an air conditioner unit which includes an evaporator air delivery fan assembly which may be attached to the unit without use of conventional nut and bolt type fastening means.

It is a further object of the invention to attach an evaporator air delivery assembly to a partition wall within a roof mounted air conditioner unit through the use of molded in retaining means and a friction fit mounting clip.

SUMMARY OF THE INVENTION

A mounting arrangement is provided for a fan having an outlet opening. The mounting arrangement comprises a fan mounting plate having an upper and a lower edge which is attached to the fan and which has an opening therein in registry with the outlet of the fan. The fan mounting plate is adapted to be attached to a wall having an opening therein adapted to receive a flow of air therethrough from the fan assembly. The wall is adapted to cooperate with one side of the mounting plate with the opening in the plate and the opening in the wall in sealed fluid flow relation with one another. Structural retaining means are provided, spaced from the wall a distance substantially equal to the thickness of the mounting plate and defining a space therebetween for receiving the lower edge of the mounting plate. A vertically extending notch is provided in the upper edge of the mounting plate. A substantially vertically oriented U-shaped bracket is structurally affixed to the wall and located such that it extends into the notch in the plate, when the plate is placed into the receiving space and is in confronting contact with the wall. A retaining clip is provided which includes three spaced parallel fingers. The middle finger of the clip is adapted to be received within the U-shaped bracket and the two other fingers adapted to engage the other side of the mounting plate on opposite sides of the notch when the clip is inserted into engagement therewith. The thickness of the fingers is such that the clip is frictionally retained in the described position to thereby hold the plate in operable engagement with the wall.

BRIEF DESCRIPTION OF THE DRAWINGS

This invention may be better understood and its numerous objects and advantages will become apparent to those skilled in the art by reference to the accompanying drawings, in which:

FIG. 6 is an enlarged cross sectional view taken along the line 6—6 of FIG. 5;

FIG. 7 is a view similar to FIG. 6 illustrating another embodiment of the invention;

FIG. 12 is a cross sectional view of the mounting of an evaporator fan assembly taken along the line 12—12 of FIG. 5;

FIG. 13 is a perspective view of an evaporator air delivery assembly;

FIG. 14 is a perspective view of the evaporator air assembly attachment clip;

FIG. 15 is a broken away perspective view of the partition upon which the evaporator air delivery fans are mounted; and FIG. 16 is an enlarged view showing engagement of the clip of FIG. 14 with an evaporator fan assembly and the mating hardware.

DESCRIPTION OF THE PREFERRED EMBODIMENT

Figure 1:
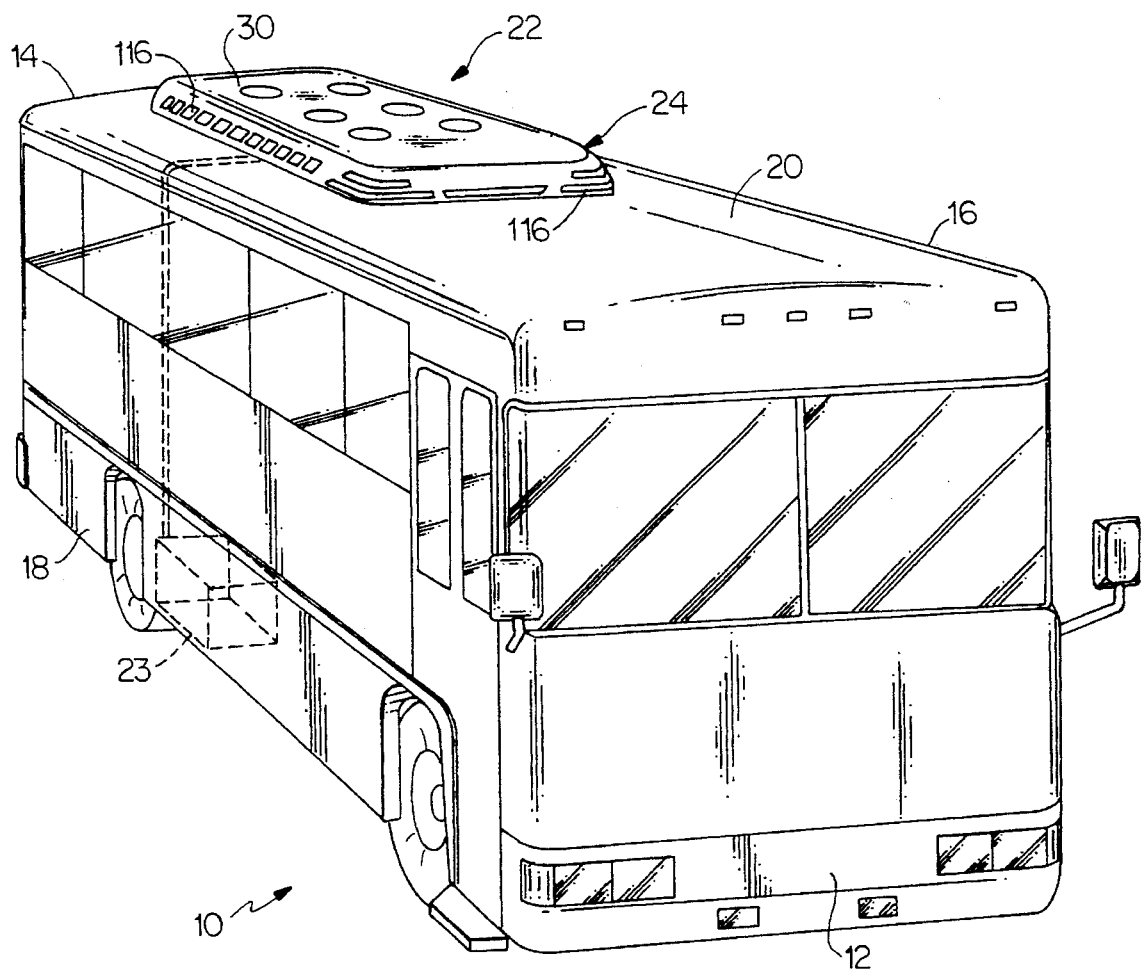
FIG. 1 is a perspective view of a bus having an air conditioner unit according to the present invention mounted on the roof thereof.

Referring now to the drawings, and to FIG. 1 in particular, there is shown a vehicle 10, such as a transit bus, having a front 12, back 14, and first and second sides, 16 and 18, respectively. The bus has a roof 20 and an interior passenger compartment 21 best shown in FIG. 8.

The bus 10 includes an air conditioning system 22, which is made up of a single air conditioner unit 24 and a power pack 23. The power pack 23, which is shown only diagrammatically in FIG. 1 is of conventional design and is typically mounted within the bus 10, adjacent to one of the bus sides. As is well understood in the art, the power pack 23 includes a refrigerant compressor, and a prime mover such as an internal combustion engine.

The air conditioner unit 24 is mounted on the roof 20 of the bus by any suitable means (not shown). As will be described in detail below, the air conditioner unit contains the evaporator and condenser coils for the air conditioning system, the blowers or fans for causing circulation of air across these coils, the air passageways for such air flow, as well as other standard components of a vapor compression air conditioning system.

Figure 2:
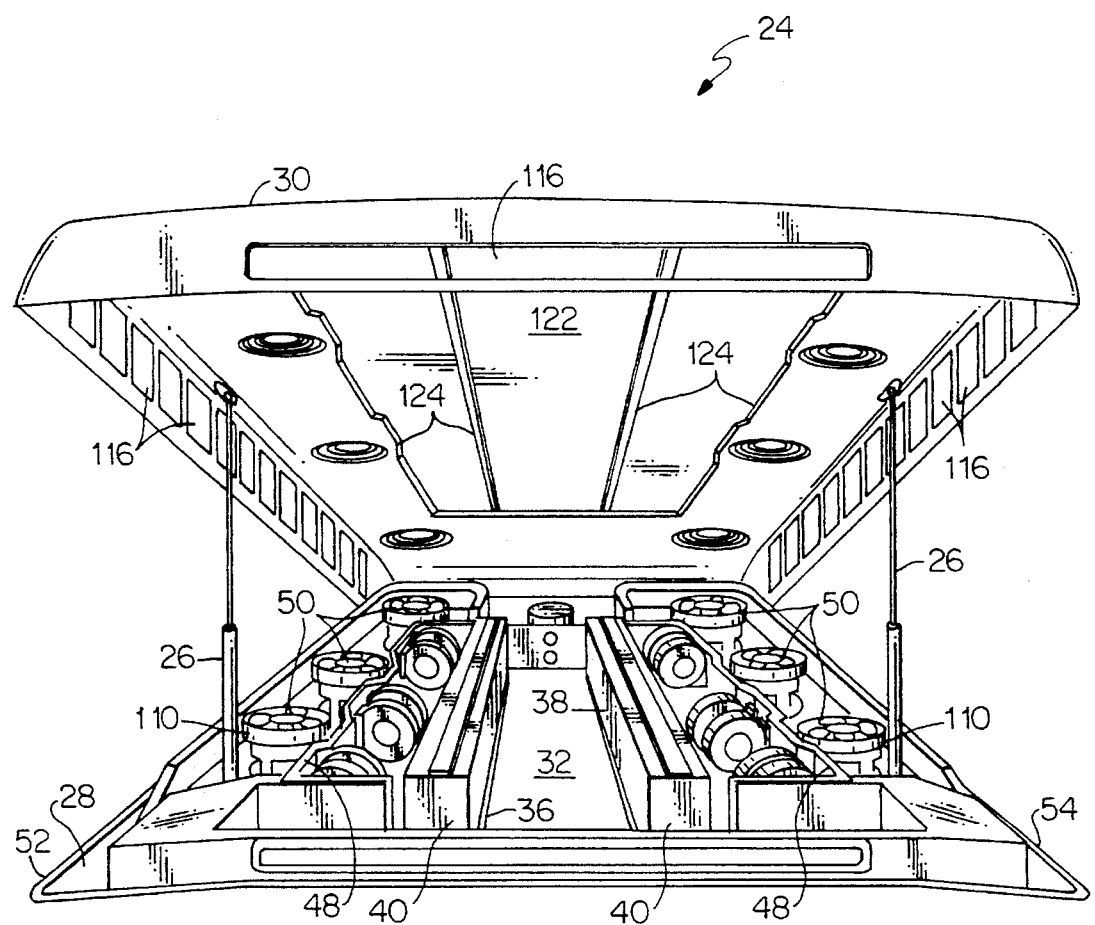
FIG. 2 is a perspective view of the air conditioner unit shown in FIG. 1 with the cover thereof opened to show the interior thereof.
Figure 3:
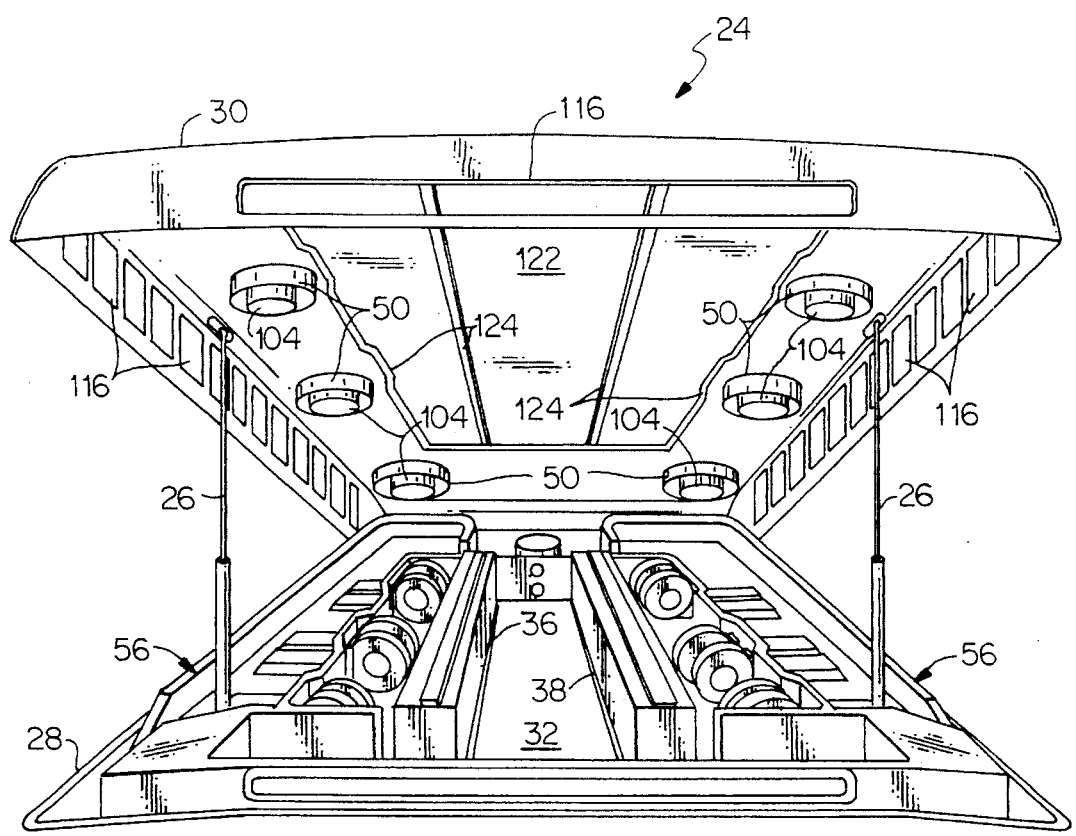
FIG. 3 is a view similar to that of FIG. 2 illustrating another embodiment of the invention.

Referring now to FIGS. 2 and 3, wherein two embodiments of the air conditioning unit 24 are shown, it will be noted that the unit comprises a base section 28 and a cover 30. The cover 30 is hinged at one end thereof by suitable hardware (not shown) and is likewise provided with suitable conventional latching hardware (not shown) at the other end thereof to facilitate holding the cover in its closed position as illustrated in FIG. 1 during normal operation of the system. Suitable devices, such as gas struts 26 are provided to hold the cover in the open position when desired.

Figure 5:
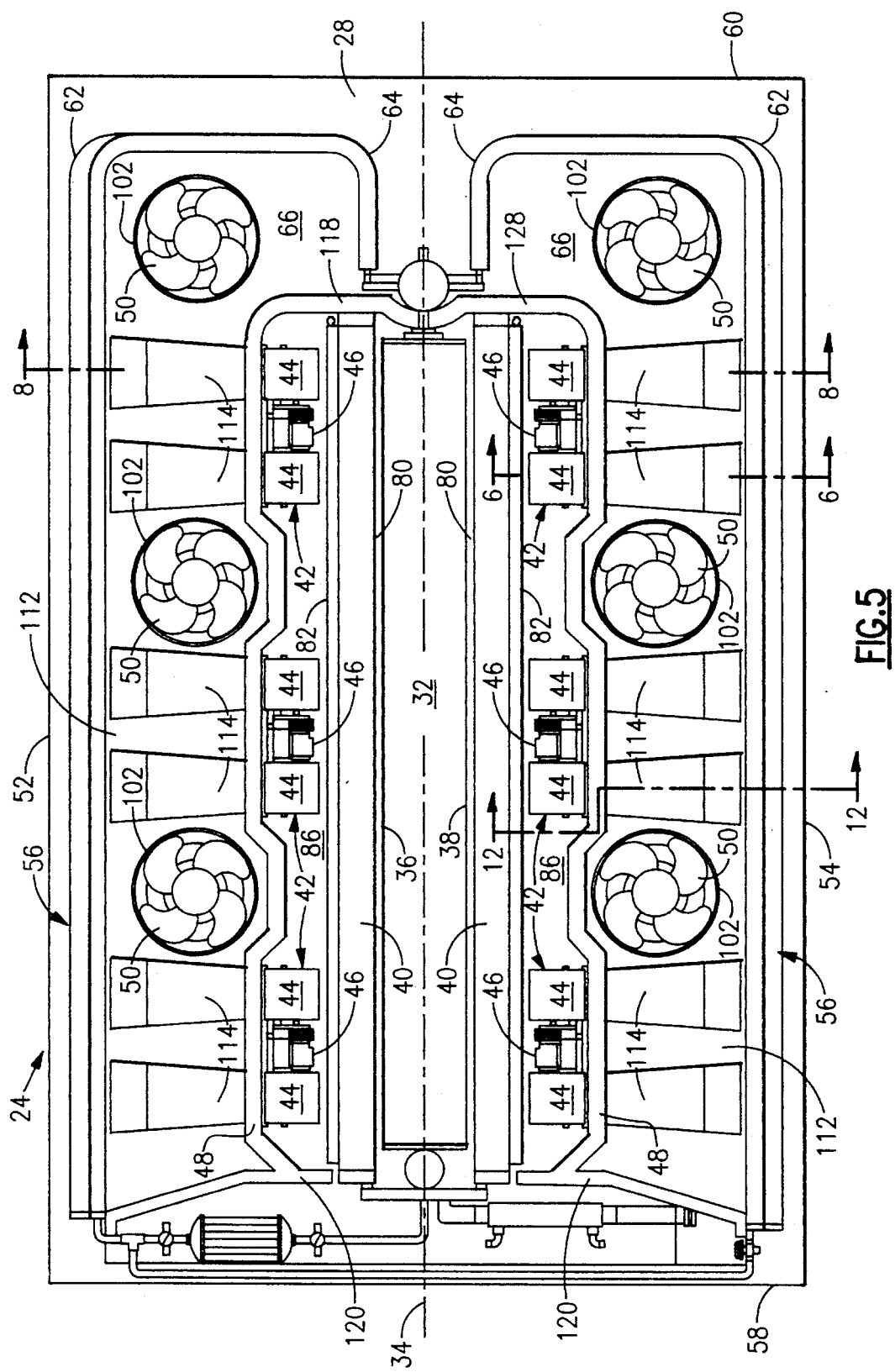
FIG. 5 is a plan view of the air conditioner unit of FIG. 1 with the upper cover removed.

As will be seen, the base 28 and the cover 30 are molded from a plastic resin, preferably a fiberglass reinforced thermosetting resin, in a single piece unit and are adapted to cooperate with one another when in the closed position to provide structural support of all components in the unit and to define the condenser air flow path and the evaporator air flow path of the unit. The location of the various major components will first be described and then the relationship of these components to the structural elements of the base 28 and the cover 30, and the air flow paths will be described in detail. As best shown in FIGS. 2, 3 and 5, the base 28 is provided with a centrally located elongated opening 32. This opening 32 extends parallel to the longitudinal axis 34 of the base 28. As is seen in the various drawing figures, this axis extends between the front and back of the vehicle and is substantially parallel to the first and second sides 16 and 18 of the bus 10.

Located adjacent to each of the sides 36 and 38 of the elongated opening 32 is an elongated evaporator coil 40. Since the unit is symmetrical about the longitudinal axis 34, the same reference numerals will be applied to the various components of the system on each side of the axis. Located outboard from the evaporator coils 40 are three evaporator air delivery means 42. Each of the evaporator air delivery means 42 comprises a blower assembly having two blowers 44 driven by an intermediately disposed electric motor 46. Each of the evaporator air delivery means 42 is attached to a partition 48 which forms an integral part of the base 28. Both the partition and the attachment of the evaporator air delivery assemblies 42 thereto will be described in more detail below.

Located outboard from the partitions 48 are the condenser air delivery fans 50. The condenser air delivery fans 50 comprise two groups of three axial flow fans arranged to effect a vertical air flow relative to the unit 24. Two embodiments are illustrated for supporting the condenser air delivery fans 50 in their desired location. With reference to FIG. 2, it will be noted that the condenser air delivery fans 50 are mounted in a spaced relationship within the base 28. With reference to FIG. 3, the condenser air delivery fans 50 are mounted directly to the cover 30. Regardless of the method of mounting, the fans are in the same location when the cover 30 is closed and the unit is in operation. Each of these arrangements will be described in more detail below.

Finally, located outboard from the condenser air delivery fans 50 and adjacent to the sides 52 and 54 of the base 28, are the condenser heat exchange coils 56. It should be noted that the condenser coils 56 extend longitudinally from one end 58 of the base in an inclined orientation to the other end 60 of the base wherein they undergo a double bend to transition to a substantially vertical orientation and a further bend 64 to define a U-shaped end thereto. The U-shaped end which provides three surfaces of the condenser surrounding a region 66 in which one of the condenser air delivery fans 50 is located.

Figure 8:
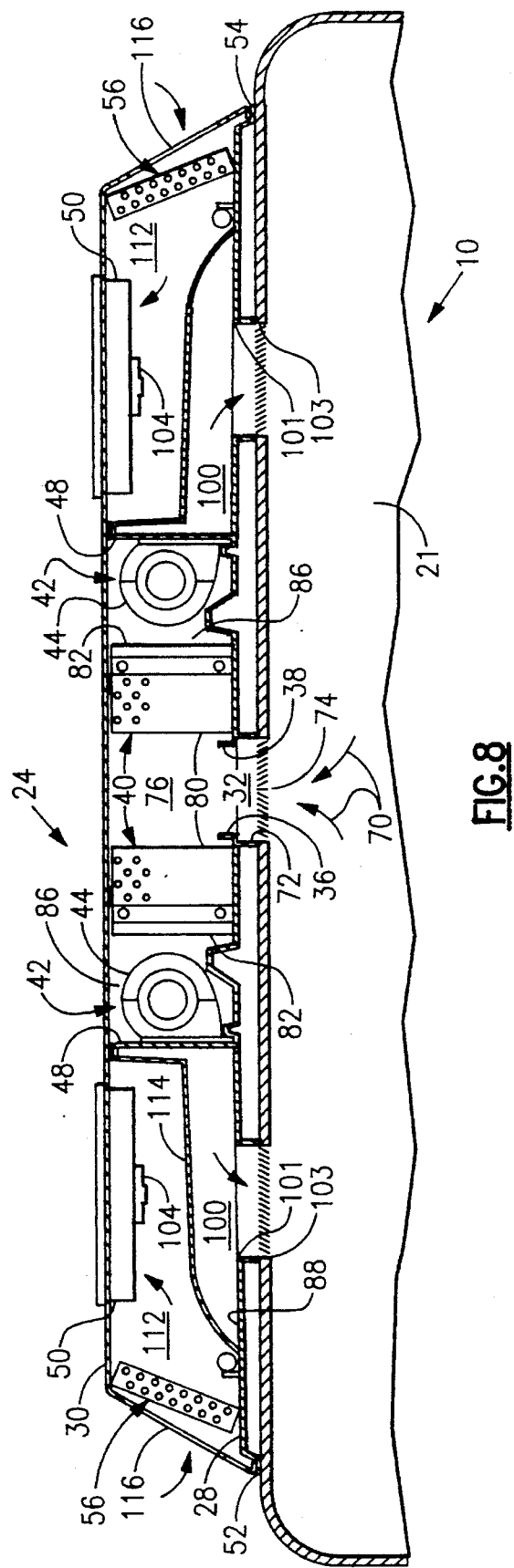
FIG. 8 is a cross sectional view of the unit as taken along the line 8—8 of FIG. 5 illustrating the unit mounted on a bus roof top.

Looking now primarily at FIGS. 6, 7 and 8 and with secondary reference to FIGS. 2, 3, 4 and 5, the air flow paths through the air conditioner unit 24 will be described. FIG. 8 illustrates a cross sectional area of the unit 28 mounted on the roof 20 of a bus 10. It should be appreciated that this showing is simplified and is meant only to facilitate the description of the air flow paths. First, the return flow from the passenger compartment 68, as illustrated by arrows 70, is through a longitudinal opening 72 in the roof of the bus which is configured to communicate with the elongated opening 32 in the base 28 of the air conditioner unit. A grill or louvers 74 or the like typically will be provided in the opening 72.

Air flowing from the interior of the bus is caused to flow by action of the evaporator air delivery fans 42 through the openings 72 and 32 and into an elongated plenum 76, which is defined on its upper side by the cover 30 and on its left and right sides by the faces 80 of the evaporator coils 40. Return air drawn in to the plenum 76 is caused to pass through the two evaporator coils 40 wherein it is cooled and dehumidified. Upon passing from the opposite faces 82 of the evaporator coils, the cooled and dehumidified air passes to another plenum 86, which is defined by the upstanding partitions 48, the cover 30 and the bottom 88 of the base 28.

Looking now at FIG. 13, it will be noted that each of the evaporator air delivery assemblies includes a fan mounting plate 90 having a pair of openings therein 92 which cooperate with the discharge openings 94 of each of the individual fans 44. As will be described in more detail hereinbelow, each of the outlets 92 is designed to cooperate with mating openings 98 provided in the partitions 48.

Each of the openings 98 communicates with a supply air passageway 100 each of which is defined by a partition wall section 114 formed integrally into the molded base 28. As is evident from several of the drawing views, each of these passageways 100 extends from the mounting of the evaporator air delivery assembly 42 outwardly towards the outer edges of the unit wherein openings 101 are provided in the bottom 88 of the base 28 which cooperate with openings 103 in the roof 20 of the bus to thereby deliver cooled, dehumidified air to the passenger compartment 21.

Looking now to the condenser air flow path. First, the alternative mounting arrangements for the condenser air delivery fans 50 will be described. As mentioned hereinabove, the condenser air delivery fans are conventional axial flow fans of the type mounted within a shroud assembly 103 and each is driven by an individual motor 104. In the embodiment illustrated in FIGS. 3, 7 and 8, each of the condenser fan assemblies 50 is mounted directly in to an opening 106 provided in the cover 30. A conventional grill or the like 108 is provided to cover the upper surface thereof for aesthetic and safety purposes. Electrical supply wires for each of the motors 104 are not shown in the drawing figures but are adapted to pass from a suitable electrical supply and routed appropriately along the inside of the unit cover 30.

Another embodiment of the mounting of the condenser air delivery fans 50 is shown in FIGS. 2, 5 and 6, wherein the condenser fans, substantially as described above in connection with the previous embodiment, are supported by pedestal like supports 110, which may be molded directly into the base 28. With such an arrangement, the grill assemblies 108 are attached to the cover 30 to cover the openings 106 therein and are designed to mate with the six condenser air delivery fans 50 when the cover is moved to its closed position.

Regardless of the arrangement of supporting the condenser air delivery fans, the air flow path for condenser air is the same and is shown in FIGS. 6, 7 and 8.

As mentioned above, the preferred direction of air flow of the condenser air delivery fans 50 is vertically upwardly as viewed in the drawing figures. As a result, the entire area outside of the partitions 28, the bottom 88 of the base 28 and the upper portion of the cover 30 defines the condenser air flow plenum 112. It should be appreciated with reference to the drawing figures that this region includes the area overlying the partitions 114 which define the supply air passageways 100.

As a result of the above described arrangement, when the condenser fans are operating a region of low pressure is established within the plenum 112 and air flow is caused to move into that region through the various openings 116 provided in the outer periphery of the cover 30. As illustrated in FIGS. 6 and 7, this air flow is directly across the condenser coils 56. It should be appreciated that the condenser fans 50 located within the regions 66 defined by the U-shaped bends in the condenser coils 56 causes air flow to be drawn across three linear sections portion of the condenser coil thereby resulting in an extremely high value of heat transfer occurring in these regions of the unit.

Figure 4:
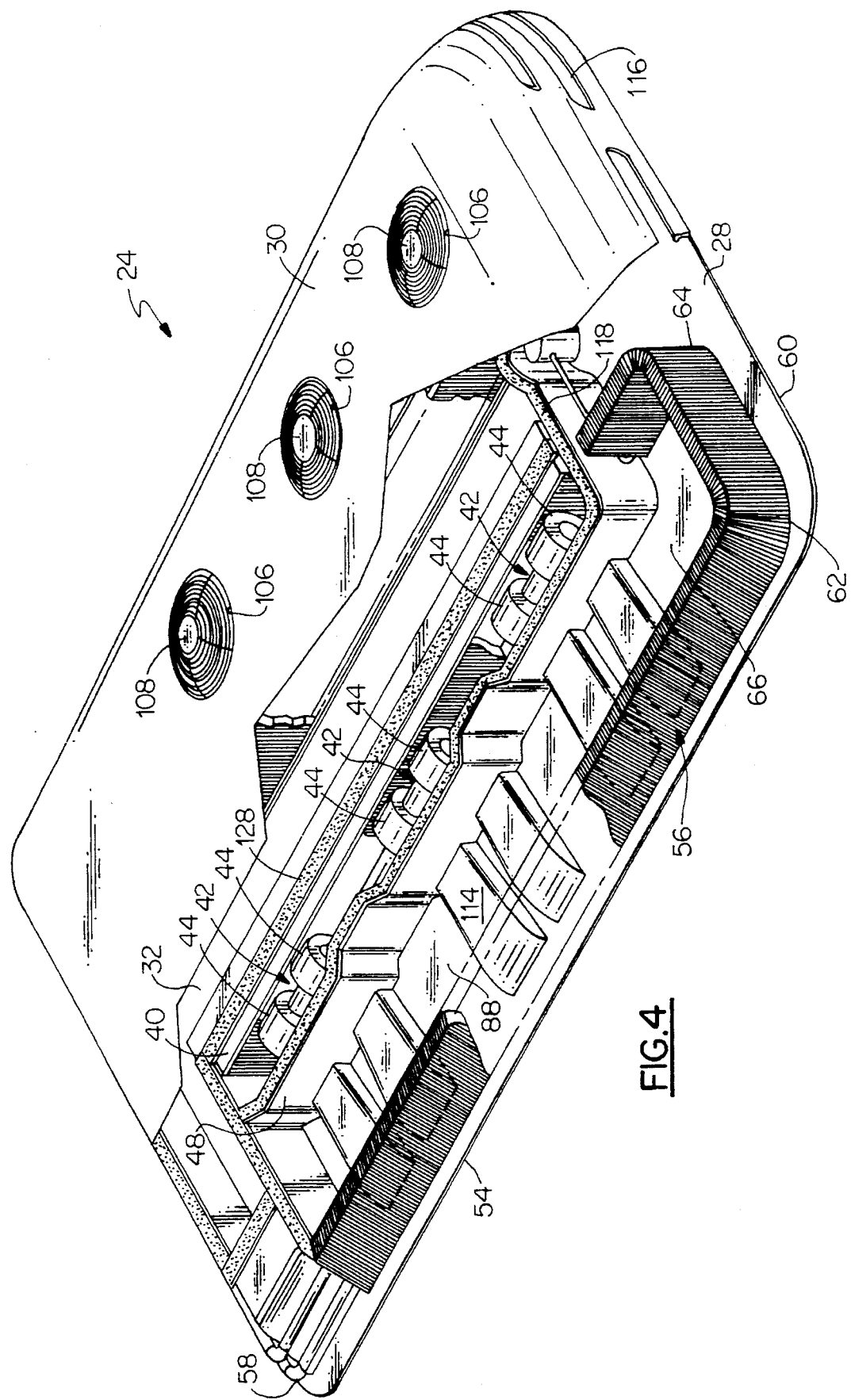
FIG. 4 is a perspective view of the air conditioner unit shown in FIG. 1 with the upper cover and some of the components partially broken away and/or removed in order to facilitate illustration of other features.

As best shown in FIGS. 4 and 5, the partitions 48 are interconnected at the right-hand end, as viewed in these drawing figures, by an end partition 118. At the left-hand end, the partitions 48 intersect with additional partition sections 120 which serve to additionally define the evaporator fan plenums 86 and the condenser fan plenums 112.

It will be appreciated with reference to FIGS. 2 and 3 that there is integrally formed with the inner surface 122 of the cover 30 a series of upstanding surfaces, generally 124, which are adapted to mate with the upper ends of the various partition sections 48, 118 and 120 to effectively seal these regions to enhance the efficiency of air flow therethrough. Also, as shown generally by reference numeral 128, gasket or sealing material may be provided on the upper edges of the various partitions in order to further enhance the desired seal.

Figure 10:
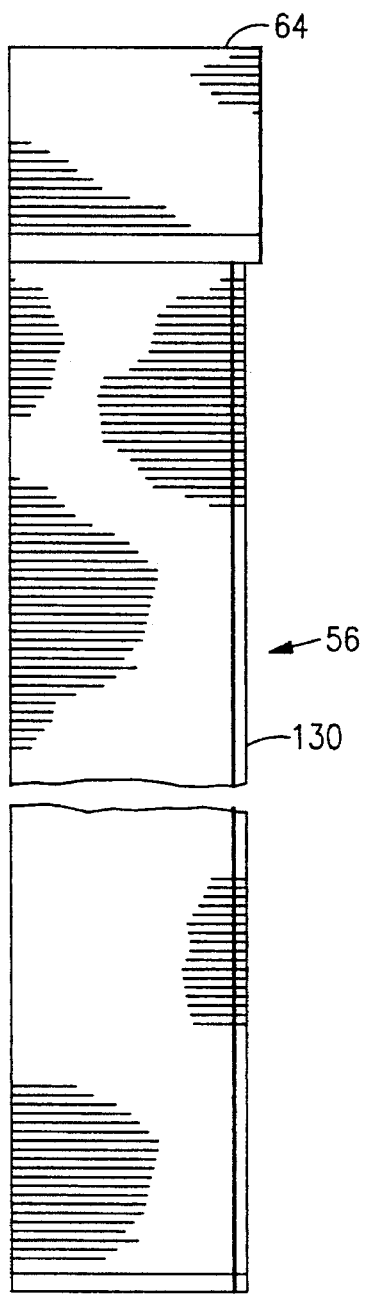
FIG. 10 is a side view of the coil of FIG. 9.
Figure 9:
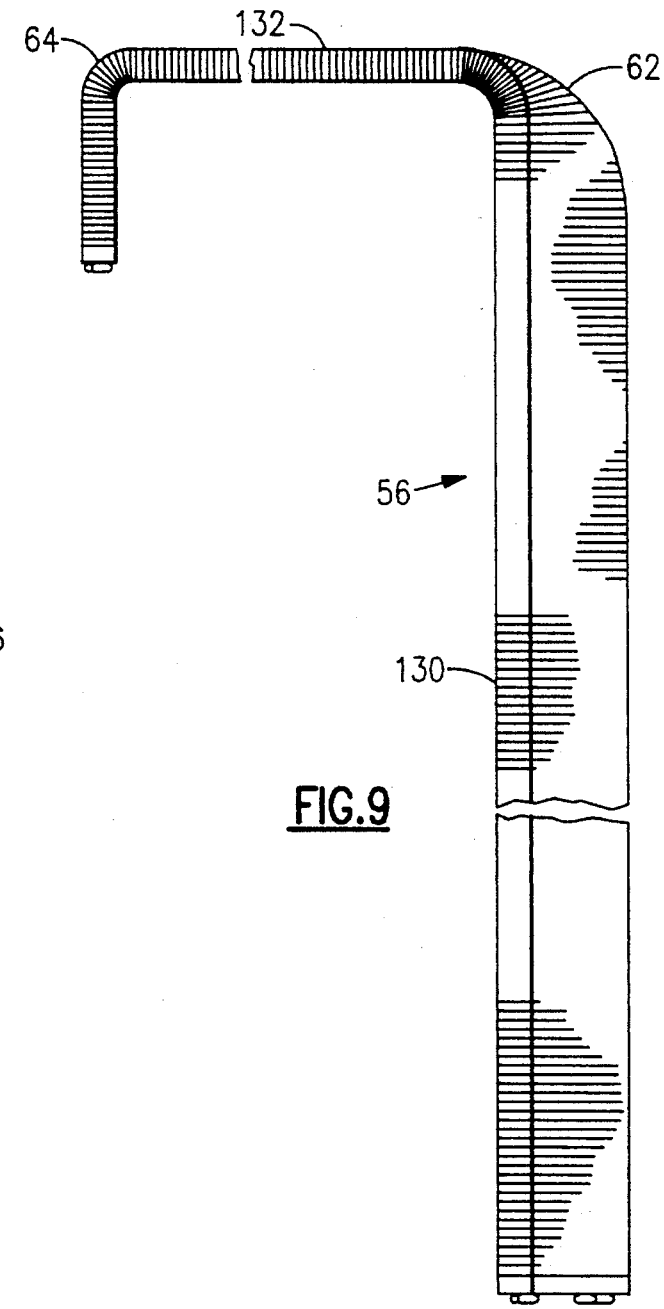
FIG. 9 is a plan view of a condenser heat exchange coil.
Figure 11:
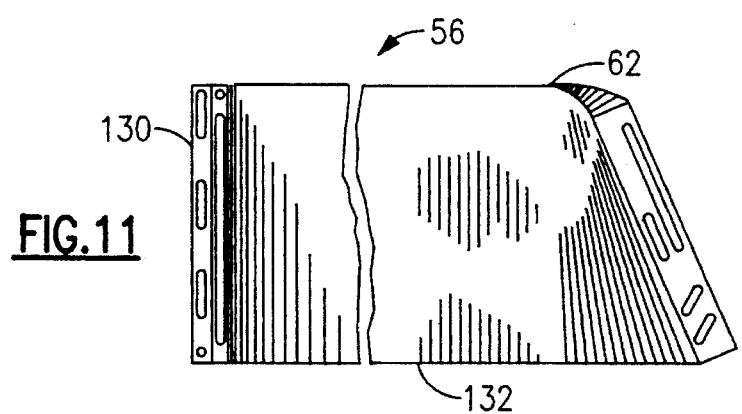
FIG. 11 is an end view of the coil of FIG. 9.

Referring in detail to the various drawing figures, and in particular FIGS. 9, 10 and 11, the details of the condenser heat exchanger coil 56 are shown. The coil 56 is of the plate fin and tube type comprising a plurality of refrigerant tubes which may comprise two or more rows extending in a serpentine fashion therethrough and having plate type heat exchange fins installed thereon. As is shown in, among other views FIGS. 4, 6, 7 and 8, the condenser coil 56 comprises a major elongated section 130 which is inclined from the vertical. As is best seen in FIGS. 4, 9 and 11, the coil makes a transition from the inclined section 130 through a double bend 62 to a vertically extending section 132. By a double bend it is meant that the heat exchange coil undergoes a bend in two different planes. Specifically, the heat exchange coil makes a 90 degree bend from the major elongated section 130 to the shorter vertical section 132 while at the same time the elongated section 130 is bent from the inclined orientation to the vertical orientation. Further, as mentioned hereinabove, the vertical section 132 then makes a further turn, as at 64, to define the U-shaped section defining the region 66 previously described.

It will be appreciated that the configuration of the condenser heat exchange coil 56 allows a combination of an aesthetically pleasing package wherein the sides of the unit are inclined and the height of the unit is minimized while at the same time allowing an increased length of condenser heat exchange coil to thereby provide optimum performance.

Looking now at FIGS. 12 through 16, the details of attachment of the evaporator air delivery assembly 42 to the partition 48 will be described. As best shown in FIG. 13 and as described hereinabove, each evaporator air delivery assembly 42 includes two blowers or fans 44 driven by an intermediately disposed electric motor 46. The blowers and motor 44, 46 are carried by an evaporator air delivery assembly mounting plate 90. The mounting plate is provided with a vertically extending notch 136 formed in the upper edge 138 thereof.

Looking now at FIG. 15, an upstanding protrusion 140 is integrally molded into the bottom 88 of the base. The upstanding protrusion 140 is spaced from the partition wall 48 a distance substantially equal to the thickness of the mounting plate 90 and defines a space 142 between the protrusion 140 and the wall 48. Attached to the partition wall 48 at a location substantially directly above the protrusion 140 is a vertically oriented U-shaped bracket 144. The bracket 144 may be formed from sheet metal and attached to the partition wall 48 permanently by conventional fastening means.

Installation of the evaporator fan delivery assembly 42 to the partition 48 is achieved by placing the lower edge 146 of the mounting plate 90 into the space 142 between the protrusion 140 and the partition wall 48 with the lower edge 146 resting on the bottom 88 of the base. The plate is then moved in to confronting sealing engagement with the partition wall 48 with the U-shaped bracket 144 extending into the notch 136. As so positioned the openings 92 in the mounting plate 90 are in fluid flow communication with the openings 98 in the partition wall 48. Attachment of the assembly is then completed by use of a retaining clip 148 as illustrated in detail in FIG. 14. The clip 148 is formed preferably from a sheet metal stamping and comprises three spaced parallel fingers 150. These fingers extend from a U-shaped channel section 152 which structurally interconnects the three fingers and provides a handle type configuration to facilitate easy manual insertion of the clip.

As shown in FIGS. 12 and 16, the clip is adapted such that the middle finger 150 is received within the U-shaped bracket and the two other fingers 150 are adapted to engage the side of the mounting plate 90 which is not in engagement with the partition 48. The size of the U-shaped bracket and the thickness of the fingers 150 are such that the fingers are frictionally retained within the U-shaped bracket 144 and in retaining relationship with the mounting plate 90 to thereby hold the mounting plate in the desired operable engagement with the partition wall 48. Removal of an evaporator fan assembly 42 or replacement for maintenance reasons, accordingly, may be readily carried out by simply withdrawing the retaining clip 148, removing the unit 42 and replacing it with an operable assembly 42, which may in turn be easily attached in the manner described.

It will thus be appreciated that there has been disclosed a new and improved roof mounted air conditioner unit 24 suitable for mounting on the roof of a vehicle such as a bus. The unit comprises a compact efficient arrangement of the heat exchange coils, air delivery passageways, and fans and makes use of an extremely compact yet large surface area condenser coil arrangement,. The unit utilizes an evaporator fan mounting arrangement which greatly simplifies the fan mounting and reduces the labor required in replacing such a fan assembly. The air conditioner further comprises a clam shell type arrangement wherein the upper cover is fabricated from a single molded piece, and, the supporting base is also a single piece in which the coils, air handling fans and air supply passages are all molded and/or supported therein.

What is claimed is:

1. A mounting arrangement for a fan having an outlet opening comprising:

a fan mounting plate attached to the fan and having an opening therein in registry with the outlet of the fan, said plate having an upper and a lower edge;

a wall having an opening therein adapted to receive a flow of air therethrough, said wall being adapted to cooperate with one side of said mounting plate with said opening in said plate and said opening in said wall in sealed fluid flow relation with one another;

structural retaining means spaced from said wall a distance substantially equal to the thickness of said mounting plate and defining a space therebetween for receiving and retaining said lower edge of said mounting plate therein;

a vertically extending notch in the upper edge of said mounting plate;

a U shaped bracket structurally affixed to said wall and located such that it extends into said notch in said plate;

a retaining clip comprising three spaced parallel fingers, the middle finger of said clip being adapted to be received within said U shaped bracket, and the two other fingers being adapted to engage the other side of said plate on opposite sides of said notch when said clip is inserted into engagement therewith, the thickness of said fingers being such that the clip is frictionally retained in the described position to thereby hold said plate in operable engagement with said wall.

2. The fan mounting arrangement of claim 1 wherein the fan has two spaced outlets, and, wherein said mounting plate has two spaced openings therein adapted to be installed in registry with said two fan outlets;

said vertically extending notch being located substantially equidistant between said spaced openings.

3. The fan mounting arrangement of claim 1 wherein said wall is oriented substantially vertically.

4. The fan mounting arrangement of claim 3 wherein and said retaining clip is oriented substantially vertically.

5. The fan mounting arrangement of claim 1 wherein said retaining clip further comprises a channel section interconnecting one end of each of said three spaced parallel fingers.

\* \* \* \* \*